(12) United States Patent
Mizote et al.

(10) Patent No.: US 12,722,407 B2
(45) Date of Patent: Sep. 1, 2026

(54) PRINTER, CONTROL METHOD, AND NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventors: Kenshi Mizote, Nagoya (JP); Hiroyuki Shirasaki, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 232 days.

(21) Appl. No.: 18/417,647

(22) Filed: Jan. 19, 2024

(65) Prior Publication Data

US 2024/0248652 A1 Jul. 25, 2024

(30) Foreign Application Priority Data

Jan. 20, 2023 (JP) ................................ 2023-007233

(51) Int. Cl.

*B41J 11/06* (2006.01)
*B41J 11/20* (2006.01)
*B41J 13/00* (2006.01)
*G06F 3/12* (2006.01)
*G06K 15/10* (2006.01)

(52) U.S. Cl.

CPC ................ *B41J 11/06* (2013.01); *B41J 11/20* (2013.01); *B41J 13/0027* (2013.01); *G06F 3/1208* (2013.01); *G06F 3/1253* (2013.01); *G06K 15/102* (2013.01)

(58) Field of Classification Search

CPC ........ B41J 11/06; B41J 11/20; B41J 13/0027; B41J 3/4078; G06F 3/1208; G06F 3/1253; G06K 15/102

See application file for complete search history.

(56) References Cited

U.S. PATENT DOCUMENTS

2021/0229472 A1 * 7/2021 Morino .................... B41J 13/10
2022/0203720 A1 * 6/2022 Kobayashi ............... B41J 11/42

FOREIGN PATENT DOCUMENTS

JP 2020062828 A 4/2020

* cited by examiner

*Primary Examiner* — Ricardo I Magallanes
*Assistant Examiner* — Natasha Dephenia Quinn
(74) *Attorney, Agent, or Firm* — HOGAN LOVELLS US LLP

(57) ABSTRACT

A printer includes a head ejecting ink from a nozzle, a platen including a placement surface on which a print medium is placed, a receiver receiving print data, and a processor. The platen moves in a movement direction between a setting position where the print medium is placed on the placement surface and a printing position where the placement surface faces the nozzle surface in a facing direction. The movement direction is orthogonal to the facing direction. The platen moves in the facing direction. The processor moves the platen to a specified height when special print data is received by the receiver. The special print data is the print data including height information indicating a platen height. The platen height is a position of the platen in the facing direction. The specified height the platen height indicated by the height information included in the special print data.

7 Claims, 9 Drawing Sheets

| FIRST STAGE | SECOND STAGE |
|---|---|
| CHANGE PLATEN HEIGHT | A |
| . . . | B |
| | C |
| | USER SETTING 1 |
| | USER SETTING 2 |
| | DATA-SPECIFIED HEIGHT |

PRINTER, CONTROL METHOD, AND NON-TRANSITORY COMPUTER-READABLE MEDIUM STORING COMPUTER-READABLE INSTRUCTIONS

REFERENCE TO RELATED APPLICATIONS

This application claims priority from Japanese Patent Application No. 2023-007233 filed on Jan. 20, 2023. The entire content of the priority application is incorporated herein by reference.

BACKGROUND ART

A printer creates a print result by ejecting an ink from an inkjet head onto a print medium on a table. The printer is provided with a detection mechanism for detecting a height of the print medium on the table. Before creating the print result, the printer raises or lowers the table on the basis of the height of the print medium detected by the detection mechanism.

SUMMARY

In the above-described printer, the height of the table is adjusted on the basis of the height of the print medium on the table detected by the detection mechanism. Thus, with the printer, there is a possibility that it may be difficult to adjust the height of the table in accordance with a quality of a print result required by a user. As a result, there is a possibility that it may be difficult for the printer to create the print result of the quality required by the user.

Embodiments of the broad principles derived herein provide a printer, a control method, and a non-transitory computer-readable medium storing computer-readable instructions that contribute to creating a print result of a quality required by a user.

A first aspect of the present disclosure relates to a printer including a head, a platen, a receiver, a processor, and a memory. The head includes a nozzle surface provided with a nozzle. The head is configured to eject ink from the nozzle. The platen includes a placement surface configured to be on which a print medium is placed. The platen is configured to move in a movement direction between a setting position where the print medium is placed on the placement surface and a printing position where the placement surface faces the nozzle surface in a facing direction. The movement direction is orthogonal to the facing direction. The platen is configured to move in the facing direction. The receiver is configured to receive print data. The memory stores computer-readable instructions that, when executed by the processor, instruct the processor to perform a process. The process includes movement processing of moving the platen to a specified height when special print data is received by the receiver, the special print data being the print data including height information indicating a platen height, the platen height being a position of the platen in the facing direction, the specified height being the platen height indicated by the height information included in the special print data.

According to the first aspect, when the special print data is received by the receiver, the processor moves the platen to the specified height by the movement processing. Thus, for example, by a user causing the height information corresponding to a required quality to be included in the print data, a print result of the required quality can be obtained. As a result, the printer contributes to creating the print result of the quality required by the user.

A second aspect of the present disclosure relates to a control method controlling a printer including a head, a platen, and a receiver. The head includes a nozzle surface provided with a nozzle. The head is configured to eject ink from the nozzle. The platen includes a placement surface configured to be on which a print medium is placed. The platen is configured to move in a movement direction between a setting position where the print medium is placed on the placement surface and a printing position where the placement surface faces the nozzle surface in a facing direction. The movement direction is orthogonal to the facing direction. The platen is configured to move in the facing direction. The receiver is configured to receive print data. The control method includes movement processing of moving the platen to a specified height when special print data is received by the receiver. The special print data is the print data including height information indicating a platen height. The platen height is a position of the platen in the facing direction. The specified height is the platen height indicated by the height information included in the special print data.

The second aspect contributes to the same advantage as the first aspect.

A third aspect of the present disclosure relates to non-transitory computer-readable medium storing computer-readable instructions executed by a computer controlling a printer including a head, a platen, and a receiver. The head includes a nozzle surface provided with a nozzle. The head is configured to eject ink from the nozzle. The platen includes a placement surface configured to be on which a print medium is placed. The platen is configured to move in a movement direction between a setting position where the print medium is placed on the placement surface and a printing position where the placement surface faces the nozzle surface in a facing direction. The movement direction is orthogonal to the facing direction. The platen is configured to move in the facing direction. The receiver is configured to receive print data. The instructions, when executed by the computer, causes the computer to perform a process. The process includes movement processing of moving the platen to a specified height when special print data is received by the receiver. The special print data is the print data including height information indicating a platen height. The platen height is a position of the platen in the facing direction. The specified height is the platen height indicated by the height information included in the special print data.

The third aspect contributes to the same advantage as the first aspect.

BRIEF DESCRIPTION OF DRAWINGS

FIG. 7 is a view showing a selection screen.

DESCRIPTION

Figure 1:
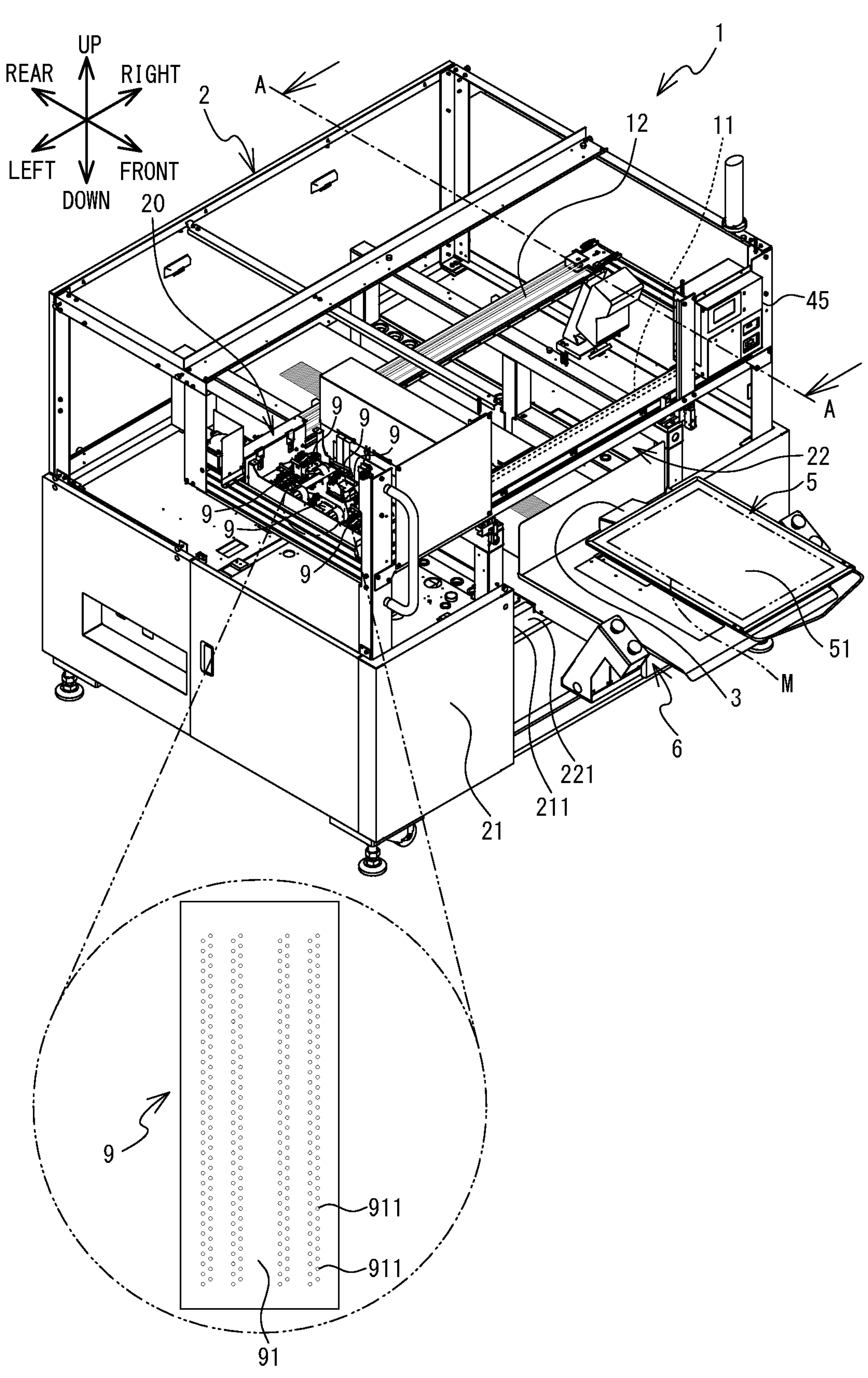
FIG. 1 is a perspective view of a printer as seen from the front and upper left.

A printer 1 according to an embodiment of the present disclosure will be explained with reference to the drawings. The upper side, the lower side, the lower left side, the upper right side, the lower right side, and the upper left side in FIG. 1 are, respectively, an upper side, a lower side, a left side, a right side, a front side, and a rear side of the printer 1. In the present embodiment, mechanical elements in the drawings indicate an actual scale.

An overall configuration of the printer 1 will be explained with reference to FIG. 1 to FIG. 3. As shown in FIG. 1, the printer 1 is provided with a housing 2, guide rails 11 and 12, a carriage 20, heads 9, a platen 5, and a platen conveyance mechanism 6. The housing 2 is a cuboid shape and includes a front wall 21. The FIG. 1 omits the top portion of the housing 2. A hole 22 is formed in the housing 2. The hole 22 extends from a central portion of the front wall 21 toward the rear. Hereinafter, of the hole 22, a region surrounded by the front wall 21 is referred to as an "opening 221." In other words, the opening 221 is a front end of the hole 22. The front wall 21 includes a left edge 211. The left edge 211 is a portion that prescribes the left end of the opening 221, and extends in the up-down direction. A display 45 is provided in the front wall 21, diagonally to the right and above the opening 221. The display 45 displays inputs various information.

The guide rail 11 is provided in an upper portion of the hole 22 to the rear of the front wall 21, and extends in the left-right direction. The guide rail 12 is provided to the rear of the guide rail 11, and extends in the left-right direction. The carriage 20 is positioned between the guide rail 11 and the guide rail 12 in the front-rear direction, and is supported by the guide rail 11 and the guide rail 12. The carriage 20 moves in the left-right direction along the guide rail 11 and the guide rail 12 as a result of the driving of a main scanning motor 19 shown in FIG. 6. The heads 9 are mounted to the carriage 20, and move in the left-right direction together with the carriage 20. The left-right direction of the printer 1 is a main scanning direction. The number of the heads 9 may be single or multiple, but in the present embodiment, is six.

An enlarged view shown in FIG. 1 is a bottom view of the head 9. A nozzle surface 91 is formed at the bottom surface of the head 9. The nozzle surface 91 is exposed downward from an opening (not shown in the drawings) provided in the carriage 20. A nozzle 911 is provided in the nozzle surface 91. The nozzle 911 is an opening. The number of the nozzles 911 may be one, but there are a plurality of the nozzles 911 in the present embodiment. The head 9 ejects ink from the plurality of nozzles 911.

The platen 5 is disposed inside the hole 22 in a front view. The platen 5 is plate shaped, and extends in the front-rear direction and the left-right direction. A placement surface 51 is formed at the upper surface of the platen 5. A print medium M is placed on the placement surface 51. The print medium M is a cloth, paper or the like, and is a T-shirt, for example. The platen conveyance mechanism 6 is disposed in a lower portion of the hole 22 and supports the platen 5. The platen conveyance mechanism 6 moves the platen 5 in the up-down direction, and also moves the platen 5 in the front-rear direction.

Figure 2:
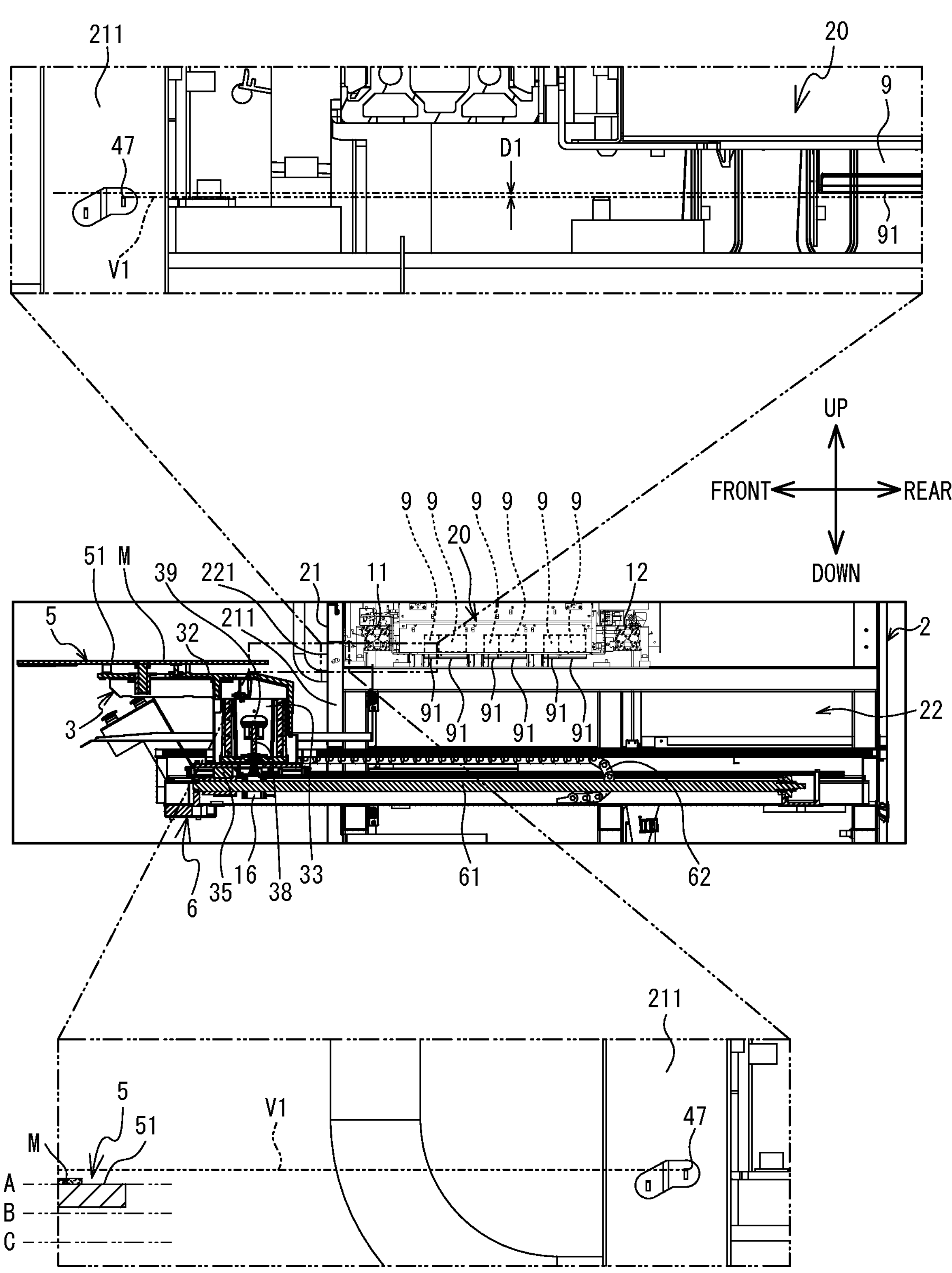
FIG. 2 is a cross-sectional view as seen in the direction of arrows on a line A-A, when a platen is positioned at a setting position.
Figure 4:
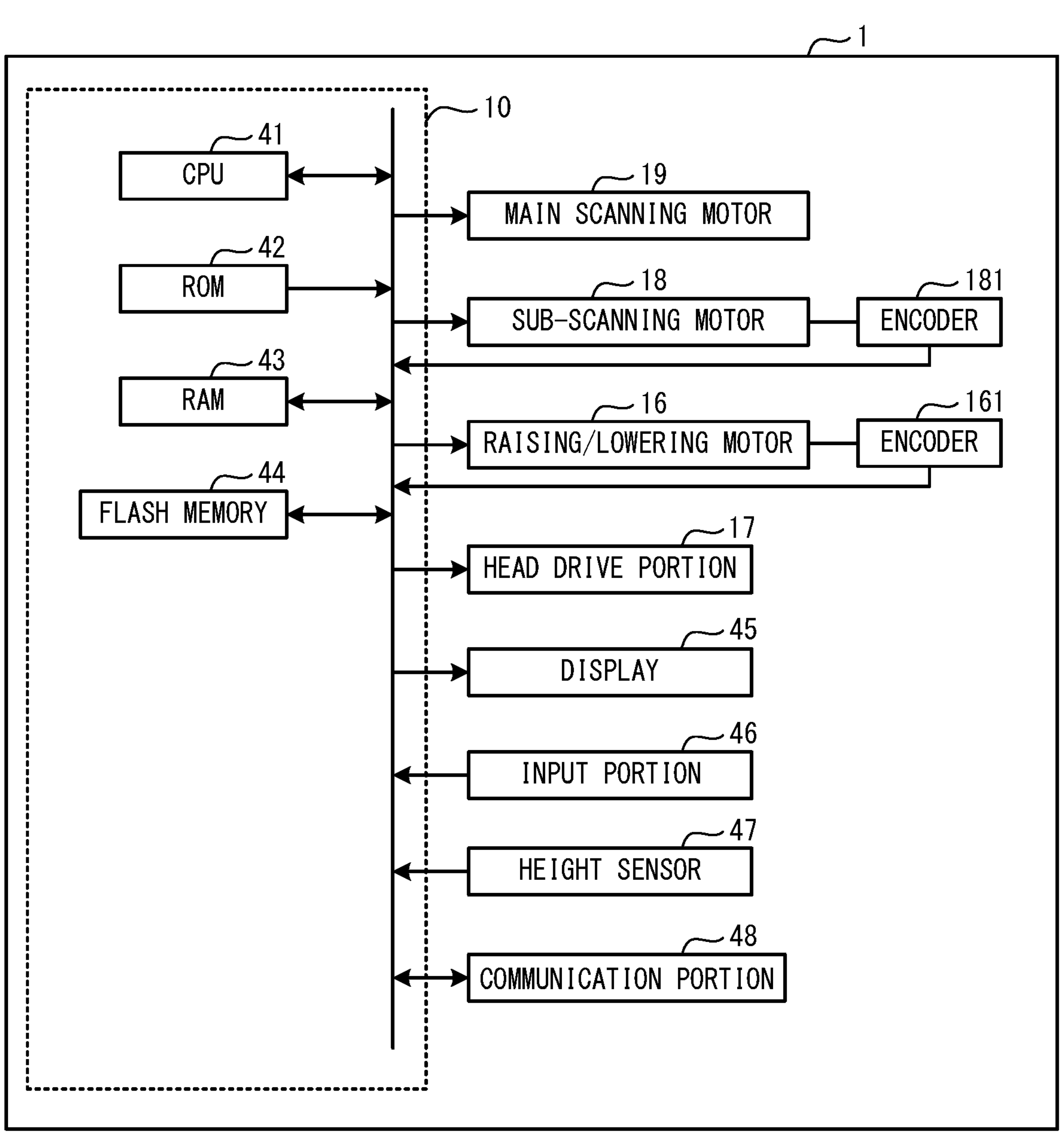
FIG. 4 is a block diagram showing an electrical configuration of the printer.

As shown in FIG. 2, the platen conveyance mechanism 6 is provided, for example, with a shaft 61, a conveyance belt 62, a platen support member 3, a coupling portion 35, a sub-scanning motor 18 shown in FIG. 4, and a raising/lowering motor 16. The shaft 61 and the conveyance belt 62 are provided in a lower portion of the hole 22, and each extends in the front-rear direction. The front end of the shaft 61 extends further to the front than the opening 221.

The platen support member 3 is provided above the shaft 61 and includes a first section 32 and a second section 33. The first section 32 is plate-shaped and extends in the horizontal direction. The second section 33 extends downward from the rear end portion of the first section 32. The coupling portion 35 is positioned below the second section 33 and is supported by the shaft 61. One end of the conveyance belt 62 is coupled to the coupling portion 35. The sub-scanning motor 18 shown in FIG. 4 is coupled to the other end of the conveyance belt 62.

The raising/lowering motor 16 is fixed to a rear portion of the coupling portion 35. An output shaft of the raising/lowering motor 16 extends upward. A ball screw 38 is fixed to the output shaft of the raising/lowering motor 16. A nut 39 is fixed inside the second section 33. The ball screw 38 is screwed into the nut 39. The platen support member 3 is coupled to the coupling portion 35 by the ball screw 38 and the nut 39 being screwed together.

According to the configuration of the above-described platen conveyance mechanism 6, when the raising/lowering motor 16 is driven, the ball screw 38 rotates with respect to the nut 39. In this way, the platen support member 3 moves in the up-down direction. The platen 5 moves in the up-down direction together with the platen support member 3. Hereinafter, a position of the platen 5 in the up-down direction will be referred to as a "platen height." The platen height is defined by a distance, in the up-down direction, between the placement surface 51 and the nozzle surface 91, for example.

When the sub-scanning motor 18 is driven, the conveyance belt 62 moves the coupling portion 35 in the front-rear direction along the shaft 61. In this way, the platen support member 3 moves in the front-rear direction. The platen 5 moves in the front-rear direction together with the platen support member 3 between a setting position (refer to FIG. 2) and a printing position (refer to FIG. 3), to be described later. The front-rear direction of the printer 1 is a sub-scanning direction orthogonal to the main scanning direction. Hereinafter, the position of the platen 5 in the front-rear direction will be referred to as a "platen conveyance position."

The printer 1 is provided with a height sensor 47. The height sensor 47 is provided on the left edge 211. The height sensor 47 is a reflective optical sensor, and is provided with a light emitting portion and a light receiving portion. The height sensor 47 emits light to the right from the light emitting portion, and receives the light using the light receiving portion.

The height sensor 47 detects the print medium M positioned at a detection position V1. The detection position V1 is a position in the up-down direction of the height sensor 47, and is, for example, a position in the up-down direction of the light emitting portion and the light receiving portion of the height sensor 47. The detection position V1 is a position separated downward by a predetermined first detection distance D1 from the nozzle surface 91. The first detection distance D1 is not limited to a particular value, but in the present embodiment, is 1.2 mm.

A pre-printing operation and a printing operation by the printer 1 will be described with reference to FIG. 2 and FIG. 3. A user places the unprinted print medium M on the placement surface 51 in a state in which the platen 5 is positioned at the setting position shown in FIG. 2. In other words, the setting position is the platen conveyance position when the print medium M is to be placed on the placement surface 51.

As shown in FIG. 2, the setting position is the platen conveyance position when the platen 5 is positioned further to the front than the front wall 21, and is, for example, the front end of a movement range of the platen 5. In the present embodiment, when the platen 5 is positioned at the setting position, the rear end of the platen 5 is disposed further to the front than the opening 221. The pre-printing operation is started when the platen 5 is positioned at the setting position. When the pre-printing operation is started, the platen 5 is conveyed from the setting position to the printing position shown in FIG. 3. With this, the pre-printing operation is complete.

Figure 3:
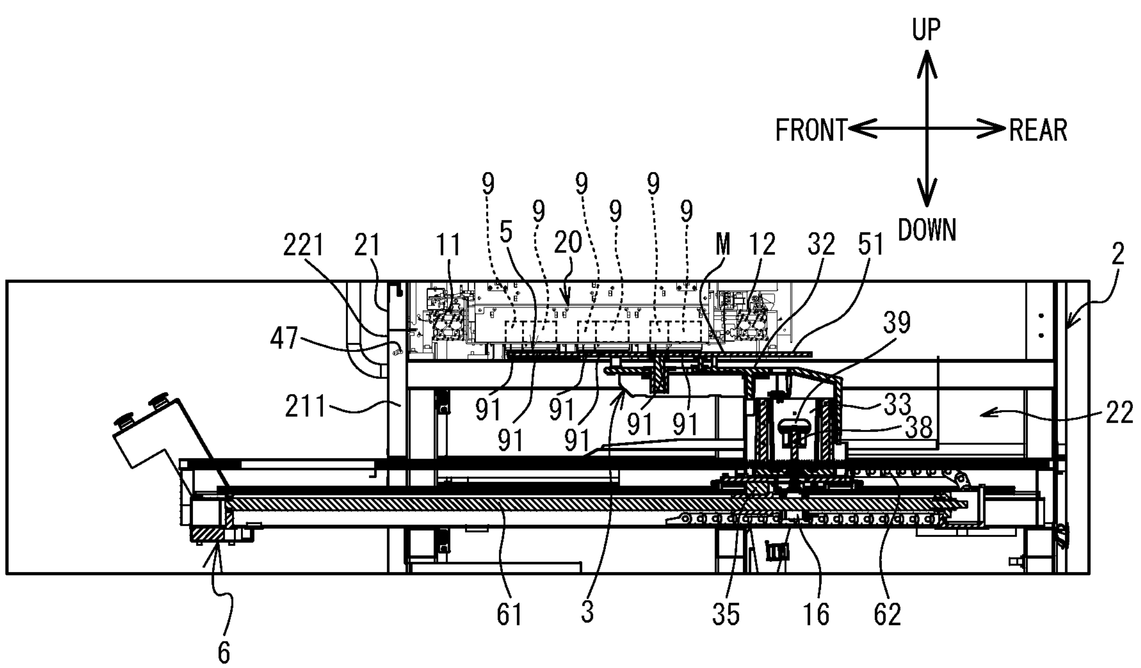
FIG. 3 is a cross-sectional view as seen in the direction of the arrows on the line A-A, when the platen is positioned at a printing position.

As shown in FIG. 3, the printing position is the platen conveyance position when the placement surface 51 faces some or all of the plurality of nozzle surfaces 91 in the up-down direction, and is further to the rear than the setting position shown in FIG. 2. The printing operation is started when the platen 5 is positioned at the printing position. When the printing operation is started, the carriage 20 moves in the left-right direction (the main scanning direction). The plurality of heads 9 eject the ink from the nozzles 911 while moving in the left-right direction together with the carriage 20. The ink ejected from the nozzles 911 land on the print medium M on the placement surface 51. The platen 5 moves in the front-rear direction (the sub-scanning direction) at the printing position. An image is printed on the print medium M as a result of repeating the movement of the heads 9 in the left-right direction while ejecting the ink, and the movement of the platen 5 in the front-rear direction at the printing position.

When the printing of the image on the print medium M is complete, the platen 5 is conveyed from the printing position shown in FIG. 2 to the setting position. With this, the printing operation by the printer 1 is complete. The user removes the printed print medium M (the print result) from the placement surface 51 in the state in which the platen 5 is positioned at the setting position shown in FIG. 2.

The electrical configuration of the printer 1 will be described with reference to FIG. 4. The printer 1 is provided with a control board 10. The control board 10 is provided with a CPU 41, a ROM 42, a RAM 43, and a flash memory 44. The CPU 41 controls the printer 1, and is electrically connected to the ROM 42, the RAM 43, and the flash memory 44. The ROM 42 stores a control program used by the CPU 41 for controlling operations of the printer 1, and information and the like necessary for the CPU 41 when executing various programs. The ROM 42 stores rotation angles of the sub-scanning motor 18 in association with the platen conveyance positions. The ROM 42 stores rotation angles of the raising/lowering motor 16 in association with the platen heights. The RAM 43 temporarily stores various data used in the control program. The flash memory 44 is non-volatile, and stores a reservation disable mode, a specification mode, print data, and the like to be described later.

The main scanning motor 19, the sub-scanning motor 18, the raising/lowering motor 16, a head drive portion 17, the display 45, an input portion 46, the height sensor 47, and a communication portion 48 are electrically connected to the CPU 41. The main scanning motor 19, the sub-scanning motor 18, the raising/lowering motor 16, and the head drive portion 17 are driven under control by the CPU 41.

The sub-scanning motor 18 is not limited to a particular type, and in the present embodiment, is a servo motor. An encoder 181 is provided in the sub-scanning motor 18. The encoder 181 detects the rotation angle of the sub-scanning motor 18, and outputs a detection result to the CPU 41. The raising/lowering motor 16 is not limited to a particular type, and in the present embodiment, is a servo motor. An encoder 161 is provided in the raising/lowering motor 16. The encoder 161 detects the rotation angle of the raising/lowering motor 16 and outputs a detection result to the CPU 41. The head drive portion 17 is a piezoelectric element or a heating element, and causes the plurality of heads 9 to eject the ink from each of the nozzles 911.

For example, the display 45 displays a stand-by screen 71 (refer to FIG. 5), a status screen 81 (refer to FIG. 6), and a selection screen 50 (refer to FIG. 7) to be described later. The input portion 46 is a touch panel, for example, and is provided at the surface of the display 45. The input portion 46 outputs information to the CPU 41 in accordance with an operation by the user. By operating the input portion 46, the user can input, to the printer 1, a printing command for executing the pre-printing operation and the printing operation to be described later, a raising/lowering command for moving the platen 5 in the up-down direction, a conveyance command for moving the platen 5 in the front-rear direction, a print reservation command for setting a print reservation to be described later, and the like.

When the height sensor 47 detects that the print medium M is at the detection position V1, the height sensor 47 outputs a detection signal to the CPU 41. Based on the detection signal from the height sensor 47, the CPU 41 can determine that the print medium M on the placement surface 51 is positioned at the detection position V1. In the present embodiment, when the height sensor 47 detects the print medium M during the pre-printing operation, for example, the CPU 41 stops the pre-printing operation during execution. In this way, the CPU 41 contributes to suppressing a possibility of the print medium M on the placement surface 51 coming into contact with the nozzle surface 91.

The communication portion 48 is an interface circuit for communicating, in a wired or wireless manner, with an external device. For example, the communication portion 48 is an interface circuit for connecting to a wireless LAN or a wired LAN. The communication includes both reception and transmission, but it is sufficient that the communication portion 48 be able to receive information from the external device. The CPU 41 communicates with the external device using the communication portion 48. The external device is a smartphone, a personal computer, a card reader, or the like.

The print reservation will be described. The print reservation is a setting for performing the pre-printing operation in a state in which the printer 1 is not able to perform the printing operation. When the print reservation is not set, the printing operation is performed in a continuous manner following the pre-printing operation, in a state in which the printer 1 is able to perform the printing operation. On the other hand, when the print reservation is set, the pre-printing operation is performed before the printer 1 is in the state of being able to perform the printing operation. Subsequently, when the printer 1 is in the state of being able to perform the printing operation, the printing operation is performed. Thus, when the print reservation is set, compared to a case in which the print reservation is not set, a time required from when the printer 1 enters the state of being able to perform the printing operation to the start of the printing operation is shortened, by a time required to perform the pre-printing operation.

In a predetermined reservation permitting condition, the user can set the print reservation by operating the input portion 46 and inputting the print reservation command to the printer 1. The reservation permitting condition is a state in which the printer 1 is not able to perform the printing operation, and in the present embodiment, is a state of receiving print data. While receiving the print data, since the printer 1 cannot identify the image (hereinafter referred to as a "print image") or the like to be printed on the print medium M on the basis of the print data being received, the printing operation cannot be performed. When the print reservation is not set, the pre-printing operation is started after waiting for the receiving of the print data to be complete. When the print reservation is set during the receiving of the print data, the pre-printing operation is performed during the receiving of the print data. Subsequently, when the receiving of the print data is complete and the printer 1 is in the state of being able to perform the printing operation, the printing operation is performed.

The print data will be described. The print data includes image data. The image data indicates a print image. In the present embodiment, there is the print data that includes height information in addition to the image data. The height information indicates the platen height, and in the present embodiment, the platen height is represented by one of "A," "B," or "C" (refer to FIG. 2). "A" indicates the highest platen height of "A," "B," and "C." "C" indicates the lowest platen height of "A," "B," and "C." "B" indicates the platen height between "A" and "C." FIG. 2 shows a state in which the platen 5 is positioned at the platen height "A."

Hereinafter, the platen height indicated by the height information will be referred to as a "data-specified height." The print data including the height information will be referred to as "special print data," and the print data not including the height information will be referred to as "normal print data." The normal print data does not include the height information, and thus indicates that the platen height is not to be specified. In the present embodiment, when the special print data is transmitted to the printer 1 from the external device, the image data is transmitted first, and the height information is transmitted after the image data.

The higher the platen height, the smaller the distance from the nozzle surface 91 to the print medium M on the placement surface 51 in the up-down direction. Thus, when the platen height is high, the more easily a high quality of the print result is achieved. Thus, a creator of the print data sets the height information in accordance with the quality required for the print result. When the high quality is required for the print result, for example, the creator of the print data sets the height information indicating "A" in the print data. The creator of the print data is a type of the user.

The stand-by screen 71 will be described with reference to FIG. 5. For example, when the user performs an operation on the input portion 46 to display the stand-by screen 71, or when a state of the input portion 46 not being operated continues for a predetermined period of time, the CPU 41 displays the stand-by screen 71 on the display 45. The stand-by screen 71 includes a print image display region 72, a remaining ink amount display region 73, a printing-related information display region 74, and a platen height display region 75.

The print image display region 72 displays the print image. In an example shown in FIG. 5, the print image display region 72 displays an image of a flower as the print image. The remaining ink amount display region 73 displays a remaining amount of ink inside an ink tank (not shown in the drawings) or an ink cartridge (not shown in the drawings). In the example shown in FIG. 5, the remaining ink amount display region 73 displays remaining ink amounts of each of "CS (pretreatment agent)", "K (black)", "Y (yellow) ", "C (cyan)", "M (magenta)", and "W (white)".

The printing-related information display region 74 displays information relating to the printing. In the example shown in FIG. 5, the printing-related information display region 74 displays, as the information relating to the printing, a file name of the print data "Sample.arx6", a size of the platen 5 "14×16 inch", an ink amount used in the printing "0.04 cc", and a number of printed sheets "000". The platen height display region 75 displays the current platen height. In the example shown in FIG. 5, "A" indicates the current platen height in the platen height display region 75.

Figure 6:
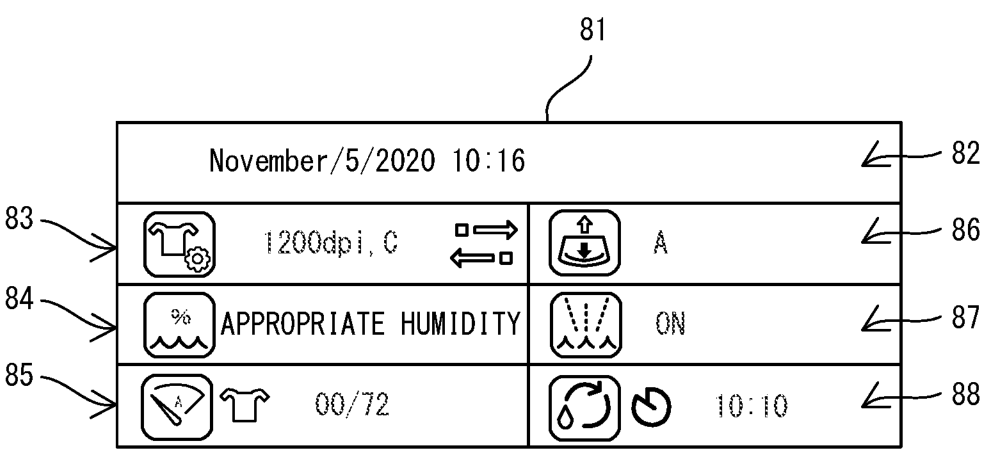
FIG. 6 is a view showing a status screen.

The status screen 81 will be described with reference to FIG. 6. For example, when the user performs an operation on the input portion 46 to display the status screen 81, the CPU 41 displays the status screen 81 on the display 45. The status screen 81 includes a date/time display region 82, a data display region 83, a humidity display region 84, a number of printed sheets display region 85, a platen height display region 86, a humidification setting display region 87, and a circulation timing display region 88.

The date/time display region 82 displays a current date and time. In an example shown in FIG. 6, the date/time display region 82 shows that the current date and time is 10:16 on Nov. 5, 2020. The data display region 83 displays a resolution and the data-specified height. In the example shown in FIG. 6, in the data display region 83, "1200 dpi" indicates the resolution, and "C" indicates the data-specified height. The humidity display region 84 displays whether or not a humidity detected by a humidity sensor (not shown in the drawings) provided in the housing 2 is within a predetermined range. In the example shown in FIG. 6, the humidity display region 84 uses "appropriate humidity" to indicate that the humidity is within the predetermined range.

The number of printed sheets display region 85 displays information relating to the number of printed sheets until post-printing processing is performed. In the example shown in FIG. 6, in the number of print results display region 85, "72" indicates the number of print results during the post-printing processing, and "00" indicates the number of print results complete up until the current time. The post-printing processing is capping of the nozzle surface 91, wiping of the nozzle surface 91, flushing by the heads 9, and the like. In the present embodiment, the post-printing processing is performed each time the printing on the print medium M is performed for a predetermined number of sheets (72, for example). The platen height display region 86 displays the current platen height. In the example shown in FIG. 6, "A" indicates the current platen height in the platen height display region 86.

The humidification setting display region 87 displays a setting as to whether or not to perform a humidification operation by a humidifier (not shown in the drawings) in order to humidify the interior of the housing 2. In the example shown in FIG. 6, the humidification setting display region 87 uses "ON" to indicate that the setting to perform the humidification operation is on. The circulation timing display region 88 indicates a timing at which a next circulation operation is to be performed. In the example shown in FIG. 6, the circulating timing display region 88 displays that the next circulation operation is to be performed at 10:10. The circulation operation is an operation to circulate the ink inside the heads 9.

On the status screen 81, the user checks various information relating to the printing, printer settings, and the like. For example, in the data display region 83 and the platen height display region 86, the user can check whether or not the current platen height is different from the data-specified height. In the example shown in FIG. 6, the data-specified height is "C" and the current platen height is "A". Thus, the user can confirm that the current platen height is different from the data-specified height.

The selection screen 50 will be described with reference to FIG. 7. For example, when the user performs an operation on the input portion 46 to display the selection screen 50, the CPU 41 displays the selection screen 50 on the display 45. The selection screen 50 includes a first stage display region 52 and a second stage display region 53. The first stage display region 52 displays selection options of a first stage. In an example shown in FIG. 7, the first stage display region 52 shows "change platen height" and the like as a first stage selection option.

The second stage display region 53 displays second stage selection options corresponding to the first stage. For example, when the user operates the input portion 46, and selects "change platen height" in the first stage display region 52, the second stage selection options corresponding to "change platen height" are displayed. In the example shown in FIG. 7, the second stage display region 53 displays "A", "B", "C", "user setting 1", "user setting 2", and "data-specified height" as the second stage selection options corresponding to "change platen height".

"A", "B", "C", "user setting 1", and "user setting 2" are, respectively, fixed platen heights. "User setting 1" and "user setting 2" are platen heights set as desired by the user. The "data-specified height" is the platen height that changes in accordance with the height information. For example, when the height information is "A", the "data-specified height" is "A". When the height information is "B", the "data-specified height" is "B".

When changing the platen height, for example, the user selects "change platen height" in the first stage display region 52. In this case, selects one of "A", "B", "C", "user setting 1", "user setting 2", or "data-specified height" in the second stage display region 53. In this way, the user inputs the raising/lowering command to the printer 1.

Hereinafter, the platen height specified by the raising/lowering command will be referred to as a "menu-specified height." In other words, the menu-specified height is the platen height selected by the user on the selection screen 50. On the selection screen 50, when the platen height is selected by the user, the platen 5 moves to the menu-specified height.

Figure 8:
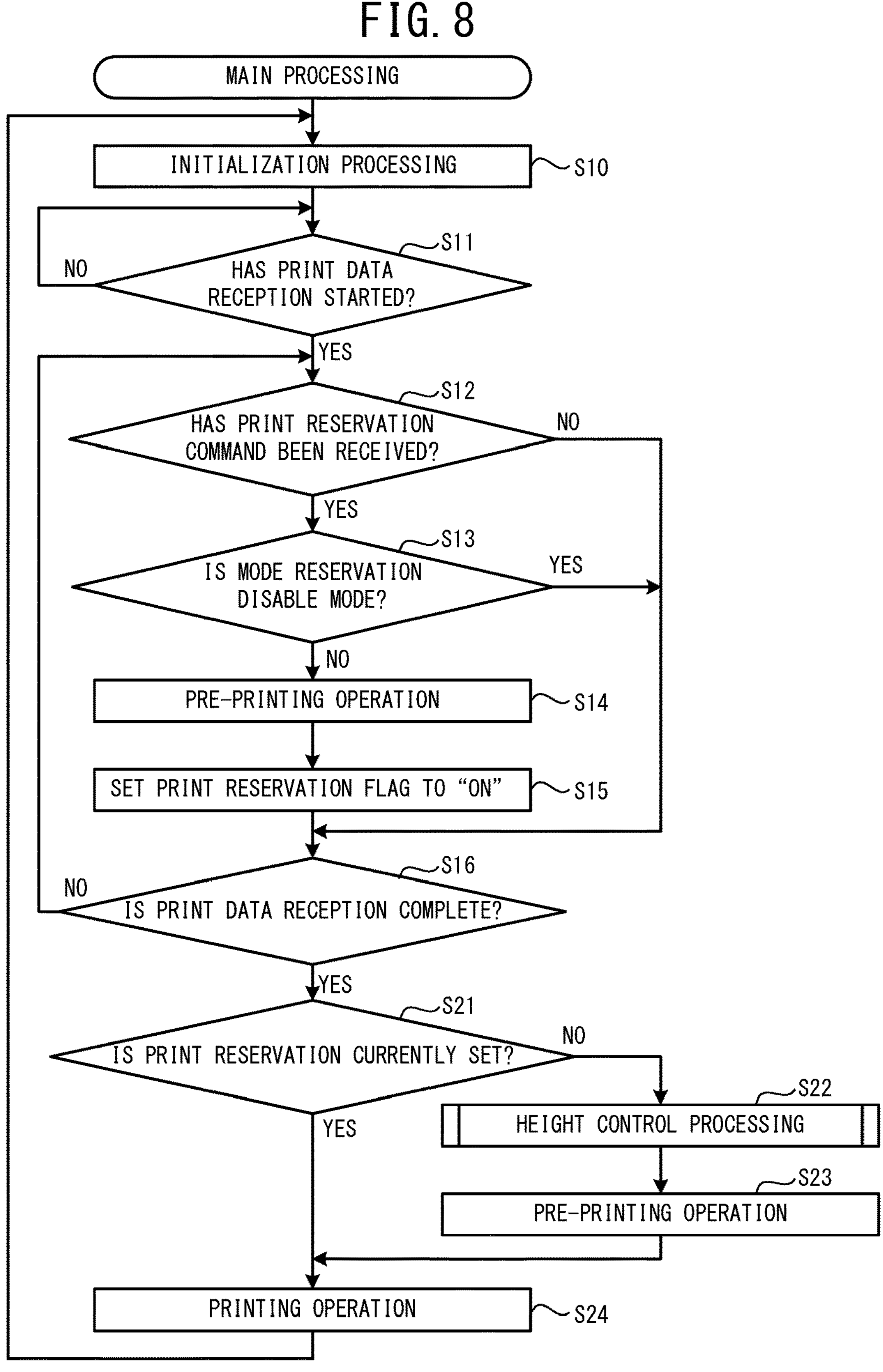
FIG. 8 is a flowchart of main processing.

Main processing will be described with reference to FIG. 8. When a power source to the printer 1 is turned on, the CPU 41 executes the main processing by reading out and operating the control program from the ROM 42. In the main processing, the raising and lowering of the platen 5, the printing operation, and the like by printer 1 are performed.

When the main processing is started, the CPU 41 performs initialization processing (S10). In the initialization processing, the CPU 41 turns a print reservation flag "OFF" in the RAM 43, for example. The print reservation flag indicates whether or not the print reservation is set. When the print reservation flag is "ON", this indicates that the print reservation is set. When the print reservation flag is "OFF", this indicates that the print reservation is not set.

The CPU 41 determines whether or not receiving of the print data by the communication portion 48 shown in FIG. 4 has started (S11). When the receiving of the print data has not started (no at S11), the CPU 41 returns the processing to the determination at S11. For example, the user operates the external device and transmits the print data to the printer 1 from the external device. When the receiving of the print data is started in this way (yes at S11), the CPU 41 determines whether or not the print reservation command has been received via the input portion 46 shown in FIG. 4 (S12).

When the print reservation command has not been received (no at S12), the CPU 41 determines whether or not the receiving of the print data is complete (S16). When the receiving of the print data is ongoing (no at S16), the CPU 41 returns the processing to the determination at S12. In other words, the CPU 41 repeats the determination at S12 from the start of the receiving of the print data to the completion thereof (during the receiving of the print data).

When the print reservation command has been received during the receiving of the print data (yes at S12), the CPU 41 refers to the flash memory 44, and determines whether or not the reservation disable mode is set (S13). The reservation disable mode is a mode in which the print reservation cannot be set. In the present embodiment, when the reservation disable mode is not set, the printer 1 is in the state of being able to set the print reservation. When the reservation disable mode is set (yes at S13), the CPU 41 does not set the print reservation and shifts the processing to the determination at S16. In this case, regardless of whether the user has input the print reservation command to the printer 1, the print reservation is not set. Thus, the CPU 41 may notify the user, using the display 45 or the like, that the print reservation is not set.

When the reservation disable mode is not set (no at S13), the CPU 41 sets the print reservation. In other words, the CPU 41 performs the pre-printing operation (S14). In the processing at S14, the CPU 41 controls the sub-scanning motor 18 on the basis of the detection result from the encoder 181 shown in FIG. 4, and conveys the platen 5 to the printing position shown in FIG. 3. The CPU 41 turns the print reservation flag in the RAM 43 "ON" (S15). The CPU 41 shifts the processing to the determination at S16.

When the receiving of all of the print data is complete (yes at S16), the CPU 41 refers to the RAM 43 and determines, on the basis of the status of the print reservation flag, whether or not the print reservation is currently set (S21). When the print reservation flag is "OFF", the CPU 41 determines that the print reservation is not currently set (no at S21). In this case, the CPU 41 performs height control processing (S22). In the height control processing, the CPU 41 controls the raising and lowering of the platen 5. The CPU 41 shifts the processing to the processing at S23.

When the print reservation is currently set, the platen 5 is positioned at the printing position shown in FIG. 3. When the platen 5 is raised or lowered in the state of the platen 5 being positioned at the printing position shown in FIG. 3, there is a possibility that the print medium M may come into contact with the nozzle surface 91. Thus, the CPU 41 prohibits the height control processing from being performed when the print reservation is currently set. As a result, when the print reservation is currently set (yes at S21), the CPU 41 skips the height control processing (S22) and the pre-printing operation (S23), and performs the printing operation on the basis of the print data (S24). In the processing at S24, the CPU 41 controls the sub-scanning motor 18, the main scanning motor 19, and the head drive portion 17 shown in FIG. 4 in the state of the platen 5 being positioned at the printing position shown in FIG. 3, and prints the print image on the print medium M. The CPU 41 controls the sub-scanning motor 18 shown in FIG. 4 and conveys the platen 5 from the printing position shown in FIG. 3 to the setting position shown in FIG. 2. The CPU 41 returns the processing to the processing at S10.

Figure 9:
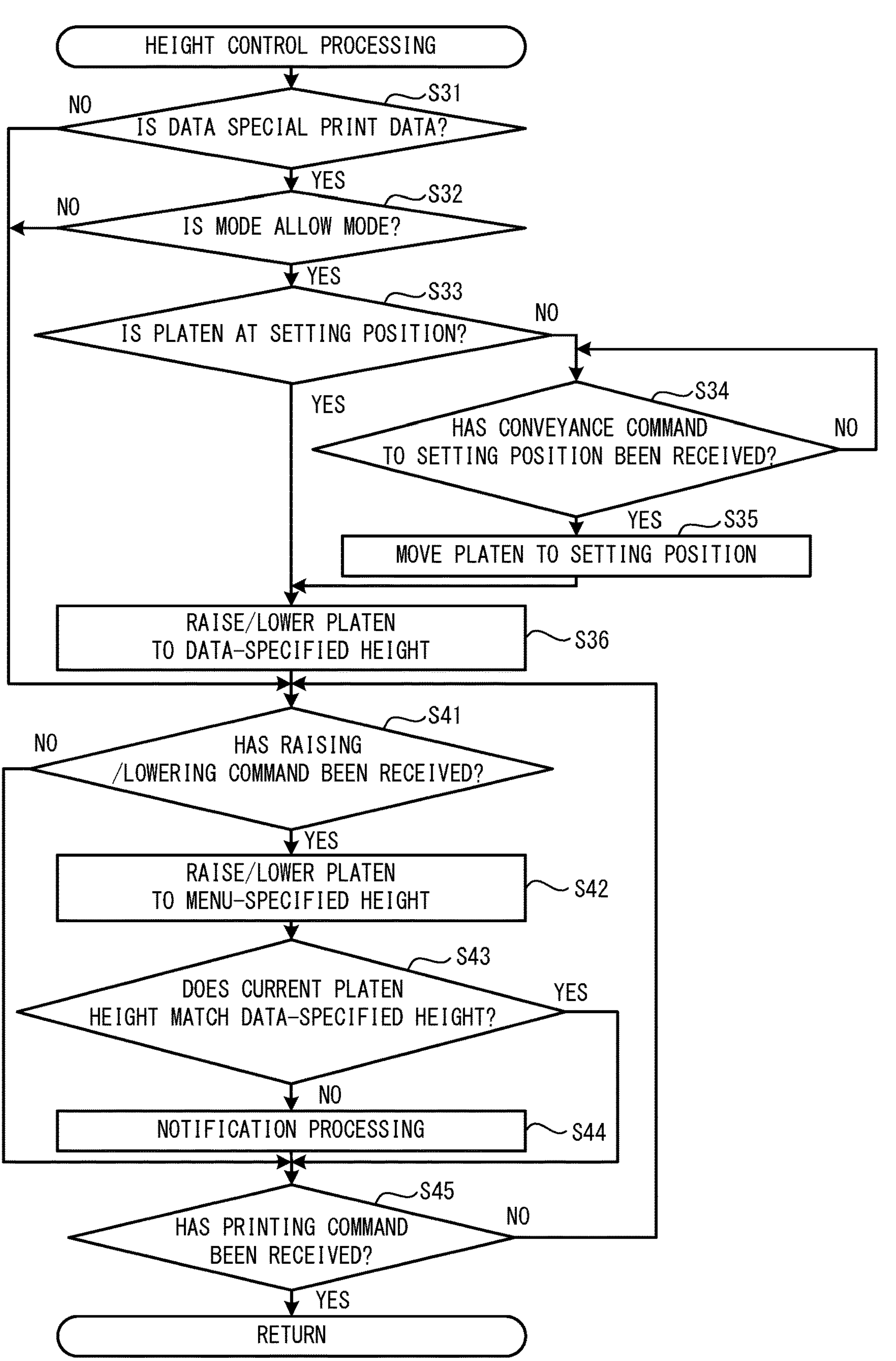
FIG. 9 is a flowchart of height control processing.

The height control processing will be described with reference to FIG. 9. When the height control processing is started, on the basis of whether or not the print data for which the reception is complete by the processing at S16 shown in FIG. 8 includes the height information, the CPU 41 determines whether or not the print data is the special print data (S31). When the print data is the normal print data (no at S31), the CPU 41 shifts the processing to a determination at S41.

When the print data is the special print data (yes at S31), the CPU 41 refers to the flash memory 44, and determines whether or not the specification mode is set to an allow mode (S32). The specification mode is a mode for deciding whether to raise or lower the platen 5 such that the platen height matches the data-specified height. The user operates the input portion 46, and sets in advance one of the allow mode or a prohibit mode, as the specification mode.

The allow mode is a mode that allows the raising and lowering of the platen 5 such that the platen height matches the data-specified height. The prohibit mode is a mode that prohibits the raising and lower of the platen 5 such that the platen height matches the data-specified height. For this reason, when the prohibit mode is set as the specification mode, the printer 1 maintains the current platen height, even if the current platen height is different from the data-specified height. Thus, when the prohibit mode is set as the specification mode (no at S32), the CPU 41 skips processing at S33 to S36, and shifts the processing to the determination at S41.

When the allow mode is set as the specification mode (yes at S32), on the basis of the detection result from the encoder 181 shown in FIG. 4, the CPU 41 determines whether or not the platen 5 is positioned at the setting position shown in FIG. 2 (S33). When the platen 5 is positioned at the setting position (yes at S33), the CPU 41 shifts the processing to the processing at S36.

For example, when the user has operated the input portion 46, and input the conveyance command to a position other than the setting position shown in FIG. 2, the platen 5 is not positioned at the setting position. Thus, there is a case in which the platen 5 is not present at the setting position when the CPU 41 receives the special print data via the communication portion 48. In this case, the CPU 41 moves the platen 5 to the data-specified height in a state in which the platen 5 is positioned at the position different from the printing position between the setting position and the printing position. In other words, the CPU 41 prohibits the raising and lowering of the platen 5 to the data-specified height in the state of the platen 5 being positioned at the printing position. In addition to the printing position, the CPU 41 also prohibits the raising and lowering of the platen 5 to the data-specified height in the state of the platen 5 being positioned at an intermediate position between the setting position and the printing position. "Between the setting position and the printing position" includes the setting position and the printing position, in addition to the intermediate position between the setting position and the printing position.

When the platen 5 is not positioned at the setting position (no at S33), the CPU 41 determines whether or not the conveyance command to the setting position shown in FIG. 2 has been received via the input portion 46 (S34). When the conveyance command to the setting position has not been received (no at S34), the CPU 41 repeats the determination at S34. When the conveyance command to the setting position has been received (yes at S34), the CPU 41 controls the sub-scanning motor 18 on the basis of the detection result from the encoder 181 shown in FIG. 4, and conveys the platen 5 to the setting position shown in FIG. 2 (S35). The CPU 41 shifts the processing to the processing at S36.

The CPU 41 controls the raising/lowering motor 16 on the basis of the detection result from the encoder 161 shown in FIG. 4, and raises or lowers the platen 5 shown in FIG. 2 such that the platen height matches the data-specified height (S36). The CPU 41 determines whether or not the raising/lowering command has been received via the input portion 46 (S41). When the raising/lowering command has not been received (no at S41), the CPU 41 shifts the processing to a determination at S45.

On the selection screen 50 shown in FIG. 7, for example, the user operates the input portion 46 and inputs, to the printer 1, the raising/lowering command that specifies the menu-specified height. When the raising/lowering command has been received (yes at S41), the CPU 41 controls the raising/lowering motor 16 on the basis of the detection result from the encoder 161 shown in FIG. 4, and raises or lowers the platen 5 shown in FIG. 2 such that the platen height matches the menu-specified height (S42). For example, when "A" is selected as the menu-specified height, the CPU 41 raises or lowers the platen 5 such that the platen height is "A". Subsequently, for example, when "data-specified height" is selected as the menu-specified height, the CPU 41 raises or lowers the platen 5 such that the platen height is the "data-specified height".

The CPU 41 determines whether or not the current platen height is the data-specified height, on the basis of the menu-specified height (S43). The CPU 41 may determine whether or not the current platen height is the data-specified height on the basis of the detection result from the encoder 161 shown in FIG. 4. The current platen height is the platen height after the platen 5 has been raised or lowered by the processing at S42. Note that when the print data is the normal print data, the data-specified height is not present, and thus, the CPU 41 skips the processing at S43 and shifts the processing to the determination at S45.

When the "data-specified height" is selected as the menu-specified height, the CPU 41 determines that the current platen height is the data-specified height (yes at S43). In this case, the CPU 41 skips the processing at S44 and shifts the processing to the determination at S45.

When the platen height other than "data-specified height" is selected as the menu-specified height, the CPU 41 determines that the current platen height is different from the data-specified height (no at S43). In this case, the CPU 41 performs notification processing (S44). In the notification processing, the CPU 41 performs notification indicating that the current platen height is different from the data-specified height.

Figure 5:
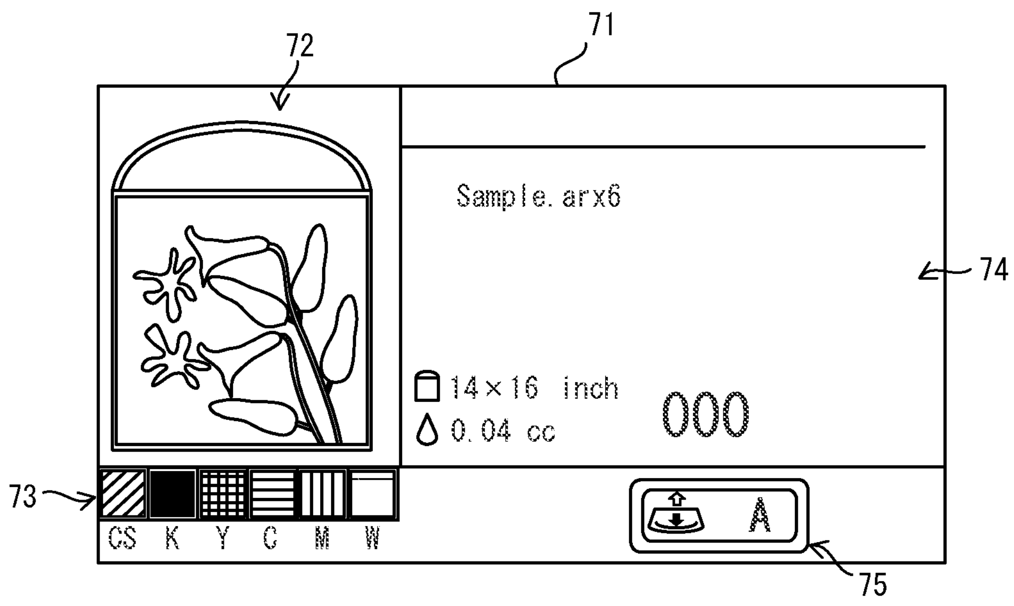
FIG. 5 is a view showing a stand-by screen.

In the notification processing, for example, on the stand-by screen 71 shown in FIG. 5, the CPU 41 may change a display color of the platen height display region 75 from a first color (black, for example) to a second color different from the first color (yellow, for example). The CPU 41 may change an illumination state of the platen height display region 75 from a non-flashing state to a flashing state. The CPU 41 may display characters on the stand-by screen 71. The CPU 41 may output a notification noise from a speaker (not shown in the drawings). The CPU 41 transmit notification information to the external device using the communication portion 48.

The CPU 41 determines whether or not the printing command has been received via the input portion 46 (S45).

When the printing command has not been received (no at S45), the CPU 41 repeats the determination at S45 until the printing command has been received. When the printing command has been received (yes at S45), the CPU 41 returns the processing to the main processing shown in FIG. 8. In this case, the pre-printing operation (S23) shown in FIG. 8 is performed in a state in which the platen height is the data-specified height as a result of the processing at S36 or in which the platen height is the menu-specified height as a result of the processing at S42, and the printing operation (S24) is performed in the continuous manner following the pre-printing operation. When the pre-printing operation is performed in the state in which the platen height is the data-specified height, the print result is created having the quality required by the creator of the print data.

As described above, according to the above-described embodiment, when the special print data is received by the communication portion 48, the CPU 41 moves the platen 5 to the data-specified height by the processing at S36. Thus, for example, by the user including the height information in the print data in accordance with the required quality, it is possible to obtain the print result of the required quality. Thus, the printer 1 contributes to creating the print result of the quality required by the user.

When the special print data has been received in the state in which the platen 5 is positioned at the position different from the setting position between the setting position and the printing position, the CPU 41 moves the platen 5 to the setting position by the processing at S35. In the processing at S36, the CPU 41 moves the platen 5 to the data-specified height in the state of the platen 5 being positioned at the position different from the printing position between the setting position and the printing position. According to this configuration, the printer 1 contributes to suppressing the print medium M on the placement surface 51 from coming into contact with the nozzle surface 91. Furthermore, when the platen 5 is raised or lowered in the state of being positioned at the printing position, even if the print medium M on the placement surface 51 is positioned higher than the detection position V1, there is the possibility that the height sensor 47 may not detect the print medium M. The printer 1 moves the platen 5 to the data-specified height in the state of the platen 5 being positioned at the position different from the printing position. Thus, the printer 1 contributes to preventing the print medium M on the placement surface 51 from not being detected by the height sensor 47.

In the processing at S44, when the current platen height is different from the data-specified height, the CPU 41 performs the notification indicating that the current platen height is different from the data-specified height. According to this configuration, the printer 1 contributes to notifying the user that the current platen height is different from the data-specified height. Thus, the user understands that the print quality of the print result created by the printer 1 will be different from the quality required by the creator of the print data.

In the state in which the allow mode is set and the special print data has been received by the communication portion 48, the CPU 41 performs the processing at S36. In the state in which the prohibit mode is set and the special print data has been received by the communication portion 48, the CPU 41 does not perform the processing at S36. According to this configuration, by setting one of the allow mode or the prohibit mode, the user can select whether or not to move the platen 5 to the data-specified height when the special print data is received by the communication portion 48. Thus, the printer 1 contributes to suppressing the platen 5 from being moved from the current platen height to the data-specified height when the user wishes to maintain the platen height at a constant height, for example.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. For example, the printer 1 may omit the prohibit mode, and may omit the determination at S32. The printer 1 may omit the determination at S43 and the notification processing at S44. In this case, the printer 1 may also omit the determination at S41 and the processing at S42. The printer 1 may omit the print reservation, and may omit the processing at S10 to S21. In this case, it is sufficient that the CPU 41 performs the processing at S22, S23, and S24.

In the above-described embodiment, the height information need not necessarily be indicated by "A", "B", and "C". For example, the height information may indicate the platen height by quality ("high quality", "normal", and the like), or may indicate the platen height by a numerical value of the distance, in the up-down direction, between the nozzle surface 91 and the placement surface 51 ("2 mm", and the like). The normal print data may include information indicating that the platen height is not to be specified. In this case, the information indicating that the platen height is not to be specified does not correspond to the height information.

In the above-described embodiment, the CPU 41 prohibits the platen 5 from being raised or lowered to the data-specified height in the state in which the platen 5 is positioned at the intermediate position between the setting position and the printing position, or at the printing position. In contrast to this, the CPU 41 may raise or lower the platen 5 to the data-specified height when the platen 5 is positioned at the printing position. The CPU 41 may raise or lower the platen 5 to the data-specified height when the platen 5 is positioned at the intermediate position between the setting position and the printing position. For example, the CPU 41 may raise or lower the platen 5 during the pre-printing operation. In other words, the CPU 41 may raise or lower the platen 5 while conveying the platen 5 from the setting position to the printing position. In this case, the CPU 41 contributes to shortening a time period required from the start of raising or lowering the platen 5 to starting the printing operation. When the platen 5 is raised or lowered during the pre-printing operation, the CPU 41 preferably completes the raising or lowering of the platen 5 before the platen 5 reaches the printing position. In this case, the CPU 41 contributes to suppressing the print medium M from coming into contact with the nozzle surface 91.

In the above-described embodiment, when the special print data is received from the external device, the height information may be transmitted before the transmission of the image data. In the determination at S16, the CPU 41 may determine whether or not the receiving of the height information is complete.

The setting position need not necessarily be the front end of the movement range of the platen 5. The platen 5 need not necessarily reciprocate between the setting position and the printing position along the same path. For example, the platen 5 may pass through the printing position from the setting position, and return to the setting position along a path provided outside the housing 2. In this case also, the platen 5 moves between the setting position and the printing position.

In the above-described embodiment, the CPU 41 controls the platen height on the basis of the detection result from the encoder 161. In contrast to this, the CPU 41 may control the platen height on the basis of the detection result from the height sensor 47. For example, the CPU 41 may control the platen height using, as a reference, the platen height at which the platen 5 is no longer detected by the height sensor 47 from a state in which the platen 5 is detected. The height sensor 47 is not limited to the optical sensor, and may be a mechanical switch, a proximity sensor, or the like. The printer 1 may be provided with a sensor for detecting the platen height, separately from the height sensor 47. For example, the printer 1 may be provided with sensors at each of the platen heights "A", "B", and "C". The control method of the platen conveyance position may also be changed in a similar manner to the control method of the platen height. For example, the printer 1 may be provided with a setting position sensor.

The reservation permitting condition is not limited to being during the receiving of the print data. For example, in addition to or in place of being during the receiving of the print data, the reservation permitting condition may be during a specific maintenance operation. The specific maintenance operation is a wetting operation, a wetting release operation, and the post-printing processing, for example. The wetting operation is an operation in which the cap is caused to closely adhere to the nozzle surface 91, the cap is filled with a liquid, and the liquid is caused to come into contact with the nozzle surface 91. The wetting operation is performed in order to reduce the temperature of the head 9, or the like. The wetting operation is performed each time the printing operation on the print medium M has been performed for the predetermined number of sheets. The wetting release operation is performed after the wetting operation, once a predetermined period of time (5 minutes, for example) has elapsed. The wetting release operation is an operation in which the liquid is discharged from inside the cap, and the cap is caused to separate from the nozzle surface 91. Note that the maintenance operations not included in the specific maintenance operation are the circulation operation of the ink (the white ink, for example) inside the head 9, and a stand-by of the predetermined time period from after the wetting operation to the wetting release operation.

When the reservation permitting condition includes during the specific maintenance operation, in the processing at S11, for example, the CPU 41 may also determine whether or not the specific maintenance operation has been started, in addition to or in place of the starting of receiving the print data. In the processing at S16, the CPU 41 may determine whether or not the specific maintenance operation is complete, in addition to or in place of the completion of the receiving of the print data. In other words, in the processing at S11, the CPU 41 may determine whether or not the reservation permitting condition is established, and in the processing at S16, may determine whether or not the reservation permitting condition is no longer established.

In the above-described embodiment, the printer 1 moves the platen 5 in the up-down direction using the ball screw 38 and the nut 39. In contrast to this, the printer 1 may move the platen 5 in the up-down direction using another mechanism. In a similar manner, the printer 1 may move the platen 5 in the front-rear direction using a different mechanism from that of the above-described embodiment.

In place of the CPU 41, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42, the flash memory 44, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or the flash memory 44. In this case, the control program may be stored in a non-transitory storage medium, such as an HDD provided in the server.

What is claimed is:

1. A printer comprising:

a head including a nozzle surface provided with a nozzle, the head being configured to eject ink from the nozzle;

a platen including a placement surface configured to be on which a print medium is placed, the platen being configured to move in a movement direction between a setting position where the print medium is placed on the placement surface and a printing position where the placement surface faces the nozzle surface in a facing direction, the movement direction being orthogonal to the facing direction, the platen being configured to move in the facing direction;

a receiver configured to receive print data, the print data including image data indicating a print image;

a processor; and a memory storing computer-readable instructions that, when executed by the processor, instruct the processor to perform a process comprising:

movement processing of moving the platen to a specified height when special print data is received by the receiver, the special print data being the print data further including height information indicating a platen height in addition to the image data, the platen height being a position of the platen in the facing direction, the specified height being the platen height indicated by the height information included in the special print data.

2. The printer according to claim 1, wherein when the special print data is received by the receiver in a state in which the platen is positioned at a position different from the setting position between the setting position and the printing position, in the movement processing, the computer-readable instructions instruct the processor to move the platen to the specified height in a state in which the platen is positioned at a position different from the printing position between the setting position and the printing position.

3. The printer according to claim 1, wherein the computer-readable instructions instruct the processor to perform a process further comprising:

notification processing of performing notification indicating that the platen height at a current time is different from the specified height, when the platen height at the current time is different from the specified height.

4. The printer according to claim 1, further comprising:

a setting portion configured to set one of an allow mode allowing execution of the movement processing or a prohibit mode prohibiting the execution of the movement processing, wherein the computer-readable instructions instruct the processor to perform the movement processing when the special print data is received by the receiver in a state of the allow mode being set by the setting portion, and not perform the movement processing when the special print data is received by the receiver in a state of the prohibit mode being set by the setting portion.

5. A control method controlling a printer including a head, a platen, and a receiver, the head including a nozzle surface provided with a nozzle, the head being configured to eject ink from the nozzle, the platen including a placement surface configured to be on which a print medium is placed, the platen being configured to move in a movement direction between a setting position where the print medium is placed on the placement surface and a printing position where the placement surface faces the nozzle surface in a facing direction, the movement direction being orthogonal to the facing direction, the platen being configured to move in the facing direction, the receiver being configured to receive print data, the print data including image data indicating a print image, the control method comprising:

movement processing of moving the platen to a specified height when special print data is received by the receiver, the special print data being the print data further including height information indicating a platen height in addition to the image data, the platen height being a position of the platen in the facing direction, the specified height being the platen height indicated by the height information included in the special print data.

6. A non-transitory computer-readable medium storing computer-readable instructions executed by a computer controlling a printer including a head, a platen, and a receiver, the head including a nozzle surface provided with a nozzle, the head being configured to eject ink from the nozzle, the platen including a placement surface configured to be on which a print medium is placed, the platen being configured to move in a movement direction between a setting position where the print medium is placed on the placement surface and a printing position where the placement surface faces the nozzle surface in a facing direction, the movement direction being orthogonal to the facing direction, the platen being configured to move in the facing direction, and the receiver being configured to receive print data, the print data including image data indicating a print image, the instructions, when executed by the computer, causing the computer to perform a process comprising:

movement processing of moving the platen to a specified height when special print data is received by the receiver, the special print data being the print data further including height information indicating a platen height in addition to the image data, the platen height being a position of the platen in the facing direction, the specified height being the platen height indicated by the height information included in the special print data.

7. The printer according to claim 3, further comprising:

an input portion configured to receive an input of the platen height, wherein the computer-readable instructions instruct the processor to perform a process further comprising: the notification processing of performing the notification indicating that the platen height at the current time is different from the specified height, when the platen height at the current time indicated by the platen height received by the input portion is different from the specified height.

* * * * *